US012807117B2

(12) United States Patent
Tione et al.

(10) Patent No.: US 12,807,117 B2
(45) Date of Patent: Nov. 24, 2026

(54) METHOD AND SYSTEM FOR GENERATING COMPRESSED AIR OF AT LEAST ONE VEHICLE, PARTICULARLY AT LEAST ONE RAILWAY VEHICLE

(71) Applicant: FAIVELEY TRANSPORT ITALIA S.P.A., Piossasco (IT)

(72) Inventors: Roberto Tione, Lauriano (IT); Jean Philippe Bouteille, Le Plessis-Brion (FR); Corrado Rossino, Villarbasse (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 483 days.

(21) Appl. No.: 18/556,326

(22) PCT Filed: Apr. 26, 2022

(86) PCT No.: PCT/IB2022/053853

§ 371 (c)(1), (2) Date: Oct. 19, 2023

(87) PCT Pub. No.: WO2022/229837

PCT Pub. Date: Nov. 3, 2022

(65) Prior Publication Data

US 2024/0190407 A1 Jun. 13, 2024

(30) Foreign Application Priority Data

Apr. 26, 2021 (IT) ........................ 102021000010484
May 3, 2021 (IT) ........................ 102021000011222

(51) Int. Cl.
*B60T 17/02* (2006.01)
*B60T 17/22* (2006.01)
*B61H 13/34* (2006.01)

(52) U.S. Cl.
CPC ............ *B60T 17/02* (2013.01); *B60T 17/228* (2013.01); *B61H 13/34* (2013.01)

(58) Field of Classification Search
CPC ........ B60T 13/665; B60T 17/02; B60T 17/04; B60T 17/228; B61H 13/00; B61H 13/34;
(Continued)

(56) References Cited

U.S. PATENT DOCUMENTS 5,123,256 A * 6/1992 Oltman ................ F25B 49/022 62/175
6,419,454 B1 * 7/2002 Christiansen ......... F04B 49/065 417/4

(Continued)

FOREIGN PATENT DOCUMENTS

CN 116194353 A * 5/2023 ................ B61F 5/10
CN 117227781 B * 10/2025 ............. B61H 11/10

(Continued)

OTHER PUBLICATIONS

ISA European Patent Office, International Search Report Issued in Application No. PCT/IB2022/053853, Sep. 13, 2022, WIPO, 3 pages.

*Primary Examiner* — Jason C Smith
(74) *Attorney, Agent, or Firm* — K&L Gates LLP

(57) ABSTRACT

A method for generating compressed air of at least one vehicle is described, comprising the step of:

a) selectively connecting a first compressor, or a second compressor, or simultaneously the first compressor and the second compressor, to an electric motor arranged to generate a driving torque.

A system for generating compressed air for at least one vehicle is also described.

20 Claims, 6 Drawing Sheets

(58) Field of Classification Search
CPC .......... B61D 27/00; F04B 39/00; F04B 41/00; F04B 39/16; F04B 49/10; F04B 49/12; B61C 17/04
See application file for complete search history.

(56) References Cited

U.S. PATENT DOCUMENTS

| | | | | |
|---|---|---|---|---|
| 9,302,682 | B2 * | 4/2016 | Graab | B61C 17/00 |
| 9,469,315 | B2 * | 10/2016 | Scharpf | B60T 13/665 |
| 10,843,673 | B2 * | 11/2020 | Hanslik | B60T 13/662 |
| 2009/0280959 | A1 * | 11/2009 | Bensch | B60T 8/361<br>477/198 |
| 2010/0139298 | A1 * | 6/2010 | Lifson | F04B 41/06<br>417/362 |
| 2013/0232965 | A1 * | 9/2013 | Ohnishi | B60T 11/26<br>60/545 |
| 2023/0138260 | A1 * | 5/2023 | Tione | B60T 8/1705<br>701/19 |
| 2023/0150556 | A1 * | 5/2023 | Grasso | B60T 13/665<br>188/33 |
| 2024/0190407 | A1 * | 6/2024 | Tione | B60T 17/228 |
| 2025/0376146 | A1 * | 12/2025 | Cotza | B60T 17/228 |

FOREIGN PATENT DOCUMENTS

| | | | | |
|---|---|---|---|---|
| EP | 0157723 | A2 * | 10/1985 | F04B 49/02 |
| EP | 2818380 | A1 * | 12/2014 | B61D 35/00 |
| JP | S6132701 | U | 2/1986 | |
| JP | 7640534 | B2 * | 3/2025 | B61D 27/0018 |
| KR | 20260007124 | A * | 1/2026 | B61H 13/20 |
| WO | WO-2015155261 | A1 * | 10/2015 | B60T 17/18 |
| WO | WO-2017042140 | A1 * | 3/2017 | B60T 17/004 |
| WO | WO-2018185055 | A1 * | 10/2018 | B60T 17/228 |
| WO | WO-2021053524 | A1 * | 3/2021 | B61D 27/0018 |

* cited by examiner

METHOD AND SYSTEM FOR GENERATING COMPRESSED AIR OF AT LEAST ONE VEHICLE, PARTICULARLY AT LEAST ONE RAILWAY VEHICLE

CROSS REFERENCE TO RELATED APPLICATIONS

The present application is a U.S. National Phase of International Application No. PCT/IB2022/053853 entitled "METHOD AND SYSTEM FOR GENERATING COMPRESSED AIR OF AT LEAST ONE VEHICLE, PARTICULARLY AT LEAST ONE RAILWAY VEHICLE," and filed on Apr. 26, 2022. International Application No. PCT/IB2022/053853 claims priority to Italian Patent Application No. 102021000010484 filed on Apr. 26, 2021 and Italian Patent Application No. 102021000011222, filed on May 3, 2021. The entire contents of each of the above-listed applications are hereby incorporated by reference for all purposes.

TECHNICAL FIELD

The present invention generally relates to the field of braking systems, in particular railway braking systems. In particular, the invention relates to a method for generating compressed air of at least one vehicle or a convoy and to a system for generating compressed air of at least one vehicle or a convoy.

PRIOR ART

The prior art will be described below with particular reference to the field of railway vehicles. Nevertheless, that which is described in the following may also apply, where possible, to vehicles in other fields.

Braking systems and suspension systems for railway vehicles for passenger transport are powered by compressed air.

A system for generating compressed air according to the prior art is illustrated in FIG. 1.

Such system for generating compressed air 100 comprises a motor 101 whose motor shaft 102 supplies a driving torque to a motor shaft 103 of a compressor 104 through an elastic coupling 105.

Through an inlet 106, the compressor 104 draws air at atmospheric pressure, compresses it and, through a pneumatic connection 107 and a non-return valve 108, supplies a dryer unit 109. The dryer unit 109 has the purpose of removing the liquid component and the vapor of the water derived from the compression of humid air and supplying dried air to a main reservoir 110 through a second duct 111 and a second non-return valve 112.

A control unit 113 receives an electrical power supply 115 and measures a pressure in the main reservoir 110 by means of a pressure transducer 114.

When the pressure in the main reservoir 110 assumes a value less than or equal to a minimum value Pmin, the control unit 113 supplies electrical power to the electric motor 101.

When the pressure in the main reservoir 110 assumes a value equal to or greater than a maximum value Pmax, the control unit 113 cuts off the electrical supply to the electric motor 101.

In the railway sector, the minimum value Pmin generally assumes values of between 6 bar and 7 bar, and the maximum value Pmax generally assumes values of between 9 bar and 10 bar.

It is prior art that the system for generating compressed air 100 is integrated inside an acoustically insulated metal structure provided with damping connections to the railway vehicle in order to reduce the noise emitted and the vibrations transmitted to a body of the railway vehicle, respectively.

Through a distribution duct 116, the compressed air stored in the main reservoir 110 is supplied to at least one user system 117, 118, such as, for example, the braking system, the suspension system, the toilets, the pantographs, the doors.

FIG. 2 illustrates a typical railway convoy 200 for carrying passengers.

Two compressed air generation systems 201 and 202, corresponding to the compressed air generation system 100 of FIG. 1, supply compressed air to a main duct 202, which in turn supplies a main reservoir 204 through a non-return valve 215.

From the main reservoir 204 various systems 205, 206, 207, such as for example the braking system, suspensions, toilets, draw compressed air for their operation.

Two compressed air generation systems 201, 202 are considered necessary for redundancy reasons, i.e. to guarantee a permanent supply of compressed air even in the event of failure of one of the two compressed air generation systems 201, 202 during operational daily service.

A control system 208 alternatively enables the two compressed air generation systems 201, 202 by means of the supply signals 209, 210, this disadvantageously meaning that one of the two compressed air generation systems 201, 202 is on average unused throughout service.

The weight of each compressed air generation system 201, 202 often exceeds 500 kg, disadvantageously requiring an unnecessary expenditure of energy to accelerate the mass thereof. This energy is then definitively lost during braking due to poor efficiency of the regenerative braking system or intrinsically dissipative mechanical friction braking.

In general, a single compressed air generation system may supply compressed air at full capacity at the total cost of two systems.

SUMMARY OF THE INVENTION

An object of the present invention is to provide a method and a system for generating compressed air of at least one vehicle, in particular at least one railway vehicle, which reduces the weight and the cost compared to compressed air generation systems according to the prior art, while respecting the redundancy requirement.

The aforesaid and other objects and advantages are achieved, according to an aspect of the invention, by a method for generating compressed air of at least one vehicle having the features defined in claim 1 and by a compressed air generation system of at least one vehicle having the features defined in claim 6. Preferred embodiments of the invention are defined in the dependent claims, the content of which is to be understood as an integral part of the present description.

BRIEF DESCRIPTION OF THE DRAWINGS

The functional and structural features of some preferred embodiments of a system for generating compressed air of at least one vehicle according to the invention will now be described. Reference is made to the accompanying drawings, in which.

DETAILED DESCRIPTION

Figure 1:
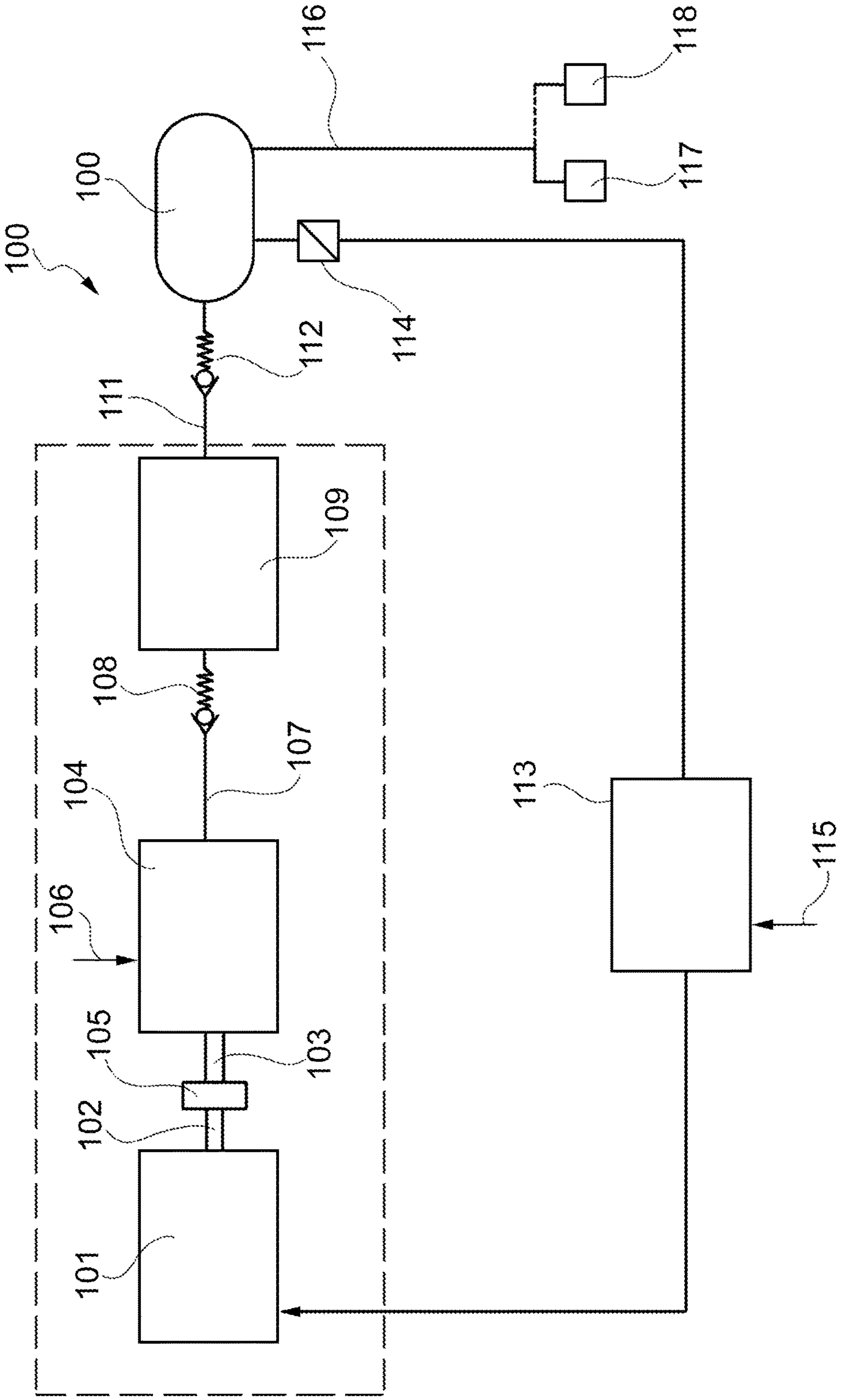
FIG.1 (PRIOR ART)
FIG. 1 illustrates an exemplary system for generating compressed air of at least one vehicle, particularly at least one railway vehicle, according to the prior art.
Figure 2:
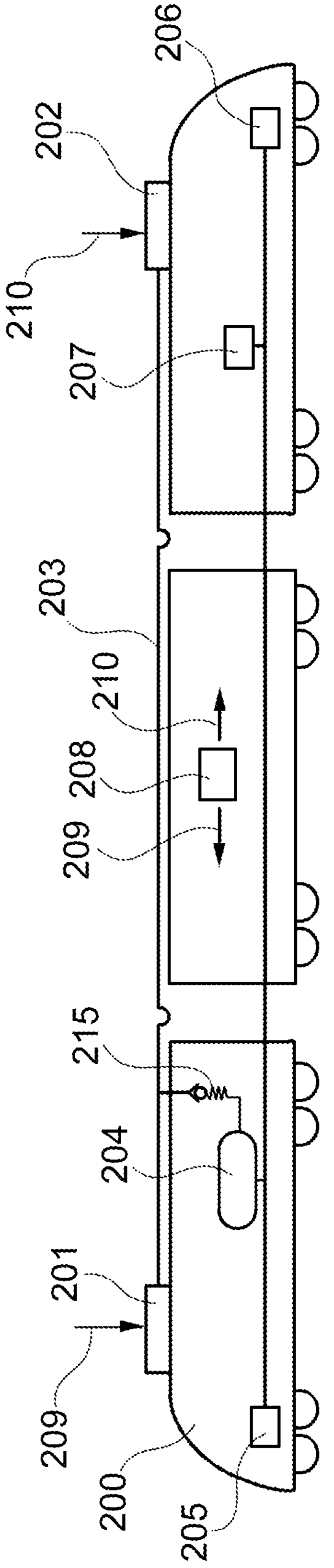
FIG.2 (PRIOR ART)
FIG. 2 illustrates an exemplary railway convoy for the transport of passengers.

Before describing in detail a plurality of embodiments of the invention, it should be clarified that the invention is not limited in its application to the design details and configuration of the components presented in the following description or illustrated in the drawings. The invention is able to assume other embodiments and to be implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

In a first embodiment, a method for generating compressed air of at least one vehicle, in particular a railway vehicle, comprises the step of:

a) selectively connecting, or disconnecting, a first compressor 303, or a second compressor 307, or simultaneously said first compressor 303 and said second compressor 307, to an electric motor 301 arranged to generate a driving torque.

Preferably, the method further comprises the step of measuring a pressure value indicative of the internal pressure of a main reservoir 311 arranged to accumulate compressed air generated by said first compressor 303 and said second compressor 307.

The pressure value inside said main reservoir 311 may assume over time a value included in a range of pressures. Such range of pressures includes a null value, a first predetermined pressure value Pmin (greater than said null value) and a second predetermined pressure value Pmax, greater than said first predetermined pressure value Pmin.

Preferably, when the pressure value in said main reservoir 311 is lower than the first predetermined pressure value Pmin, step a) may comprise:

- connecting said first compressor 303 to said electric motor 301;
- connecting said second compressor 307 to said electric motor 301;
- keeping said first compressor 303 and said second compressor 307 connected to said electric motor 301, until the pressure value in said main reservoir 311 reaches or exceeds said first predetermined pressure value Pmin (i.e. until the pressure value in said main reservoir 311 is equal to the first predetermined pressure value Pmin or higher than the first predetermined pressure value Pmin).

Preferably, in addition or alternatively to what has been said for the condition in which said pressure value is lower than the first predetermined pressure value Pmin, when the pressure value in said main reservoir 311 is equal to or greater than the second predetermined value pressure Pmax, step a) may comprise:

- disconnecting, or keeping disconnected, said first compressor 303 from said electric motor 301;
- disconnecting, or keeping disconnected, said second compressor 307 from said electric motor 301;
- keeping said first compressor 303 and said second compressor 307 disconnected from said electric motor 301, until the pressure value in said main reservoir 311 is equal to or less than said first predetermined pressure value Pmin.

Preferably, in addition or alternatively to what has been said for the condition in which said pressure value is lower than the first predetermined pressure value Pmin and for the condition in which said pressure value is equal to or greater than the second predetermined value of pressure Pmax, when the pressure value in said main reservoir 311 is equal to the first predetermined pressure value Pmin or comprised between the first predetermined pressure value Pmin and the second predetermined pressure value Pmax, step a) may selectively comprise:

- connecting, or keeping connected, said second compressor 307 to said electric motor 301;
- disconnecting, or keeping disconnected, said first compressor 303 from said electric motor 301;

keeping said second compressor 307 connected to said electric motor 301, and keeping said first compressor 303 disconnected from said electric motor 301, until the pressure value in said main reservoir 311 is equal to or greater than the second predetermined pressure value Pmax;

or,

- disconnecting, or keeping disconnected, said second compressor 307 from said electric motor 301;
- connecting, or keeping connected, said first compressor 303 to said electric motor 301;
- keeping said second compressor 307 disconnected from said electric motor 301, and keeping said first compressor 303 connected to said electric motor 301, until the pressure value in said main reservoir 311 is equal to or greater than the second predetermined pressure value Pmax.

Figure 3:
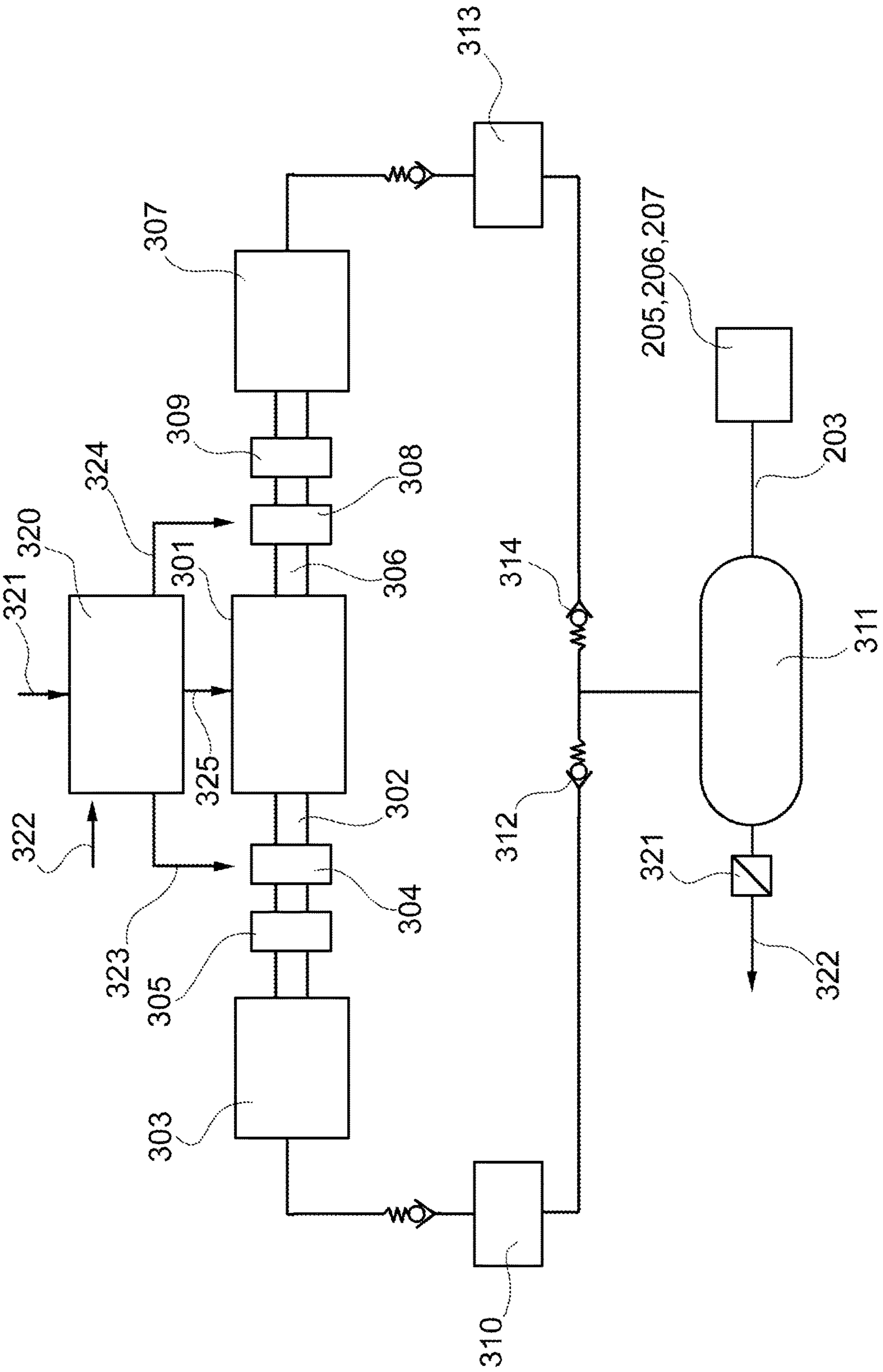
FIG. 3 illustrates a first embodiment of a compressed air generation system of at least one vehicle.

In another aspect of the invention, with reference to FIG. 3, a first embodiment of a system for generating compressed air of at least one vehicle, particularly at least one railway vehicle, is illustrated.

Such system for generating compressed air of at least one vehicle comprises an electric motor 301 arranged to generate a driving torque.

The system for generating compressed air of at least one vehicle further comprises a first coupling means 304, arranged to selectively assume a first state in which it connects said electric motor 301 to said first compressor 303 or a second state in which it disconnects said motor electric motor 301 from said first compressor 303, and a second coupling means 308, arranged to selectively assume a first state in which it connects said electric motor 301 to said second compressor 307 or a second state in which it disconnects said electric motor 301 from said second compressor 307.

The compressed air generation system of at least one vehicle further comprises a control means 320 arranged to control the transition between the first state and the second state, and vice versa, of said first coupling means 304 and the transition between the first state and the second state, and vice versa, of said second coupling means 308, so that said driving torque generated by said electric motor 301 is selectively supplied to the first compressor 303 or to the second compressor 307 or simultaneously to said first compressor 303 and to said second compressor 307.

For example, the control means may be or comprise at least one of a control unit, a processor, a microprocessor, a controller, a microcontroller, an FPGA, a PLC, or the like.

Preferably, the compressed air generation system of at least one vehicle may comprise a main reservoir 311 arranged to store compressed air generated by said first compressor 303 and said second compressor 307, and a pressure sensor means arranged to measure a pressure value inside said main reservoir 311.

The pressure value inside said main reservoir 311 may assume a pressure value included in a range of pressures. Such range of pressures includes a null value, a first predetermined pressure value Pmin (greater than said null value) and a second predetermined pressure value Pmax, greater than said first predetermined pressure value Pmin.

The pressure sensor means may be or comprise, for example, a pressure sensor or a pressure measuring device, or the like.

Preferably, when the pressure value measured by said pressure sensor means is lower than the first predetermined pressure value Pmin, the control means 320 may be arranged to:

- control said first coupling means 304 so that it is in its first state in which it connects said electric motor 301 to said first compressor 303;
- control said second coupling means 308 so that it is in its first state in which it connects said electric motor 301 to said second compressor 307;
- keep said first coupling means 304 in the first state and said second coupling means 308 in the first state, until the pressure value measured by said pressure sensor means reaches or exceeds said first predetermined pressure value Pmin (i.e. until the pressure value in said main reservoir 311 is equal to the first predetermined pressure value Pmin or higher than the first predetermined pressure value Pmin).

By higher than said first predetermined pressure value Pmin, for example, it may be understood a value equal to the second predetermined pressure value Pmax higher than said first predetermined pressure value Pmin, or a value between the first predetermined pressure value Pmin and the second predetermined pressure value Pmax.

For example, the control means 320 may:

- cause said first coupling means 304 to assume the first state in which it connects said electric motor 301 to said first compressor 303, so that the driving torque generated by the electric motor 301 is transmitted to said first compressor 303;
- cause said second coupling means 308 to assume the first state in which it connects said electric motor 301 to said second compressor 307, so that the driving torque generated by the electric motor 301 is transmitted to said second compressor 307.

Preferably, when the pressure value measured by the pressure sensor means is lower than the first predetermined pressure value Pmin, said control means 320 may be arranged to:

- drive the electric motor 301, so as to generate a driving torque having a first torque value.

Figure 6:
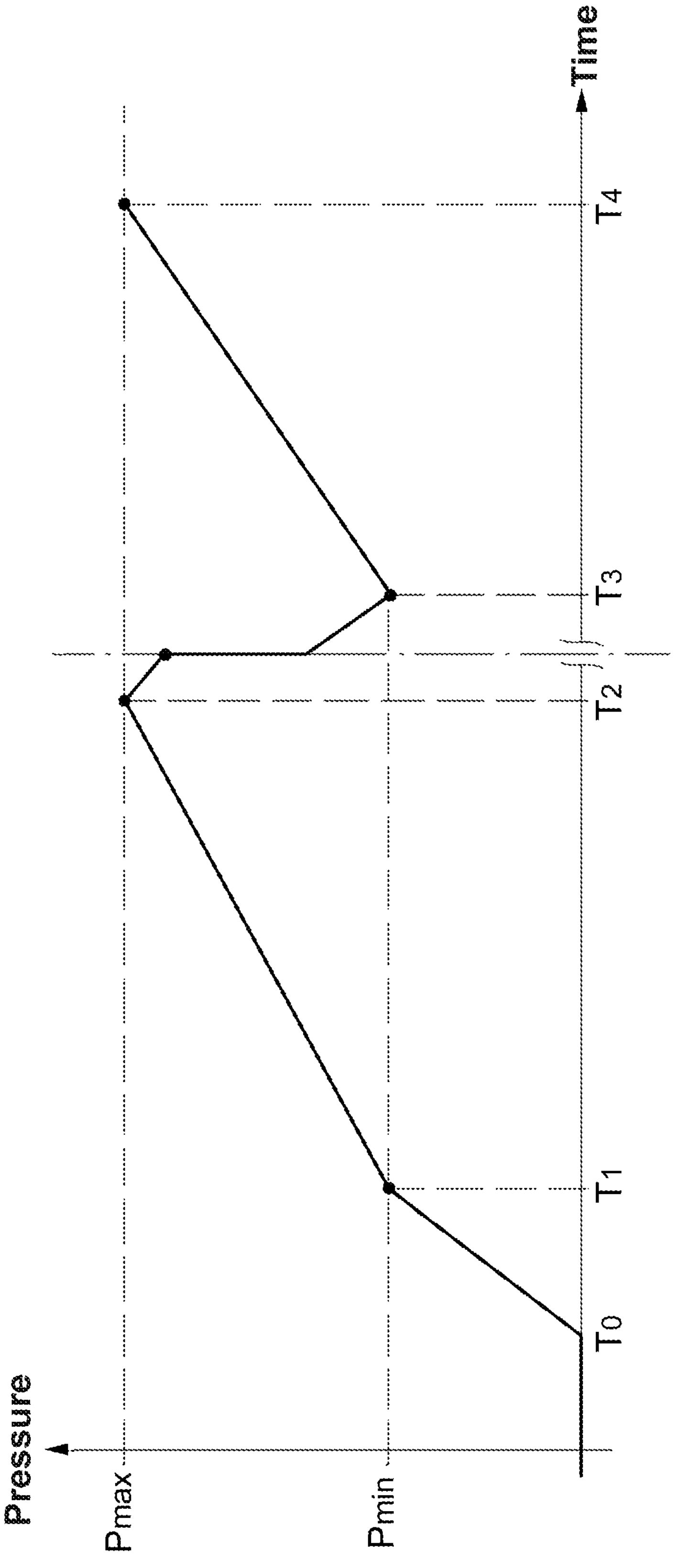
FIG. 6 illustrates a graph of an exemplary operating cycle of a compressed air generation system of at least one vehicle.

In other words, with reference to the exemplary operating cycle of FIG. 6, in an instant T0 of ignition of the vehicle or convoy, for example railway vehicle or railway convoy, the control means 320 (e.g. a control unit) may control the first coupling means 304 (e.g. a first electromechanical clutch) and the second coupling means 308 (e.g. a second electromechanical clutch 308) in their first state in which they transmit the driving torque of the electric motor 301 to the first compressor 303 and to the second compressor 307, and may control the electric motor 301 to rotate at a first speed V1, so as to generate a driving torque having a first torque value, suitable for bringing the pressure in the main reservoir 311 to the first predetermined pressure value Pmin as fast as possible.

In addition or as an alternative to what has been said for the condition in which said pressure value is lower than the first predetermined pressure value Pmin, preferably, when the pressure value measured by said pressure sensor means is equal to the first predetermined pressure value Pmin or comprised between the first predetermined pressure value Pmin and the second predetermined pressure value Pmax, the control means 320 may be selectively arranged to:

- control said second coupling means 308 so that it is in its first state in which it connects said electric motor 301 to said second compressor 307, and control said first coupling means 304 so that it is in its second state in which it disconnects said electric motor 301 from said first compressor 303;
- keep said second coupling means 308 in its first state and said first coupling means 304 in its second state, until the pressure value measured by said pressure sensor means is equal to, or greater than, the second predetermined pressure value Pmax, greater than said first predetermined pressure value Pmin;

or,

- control said first coupling means 304 so that it is in its first state in which it connects said electric motor 301 to said first compressor 303, and control said second coupling means 308 so that it is in its second state in which it disconnects said electric motor 301 from said second compressor 307;
- keep said first coupling means 304 in its first state, and said second coupling means 308 in its second state, until the pressure value measured by said pressure sensor means is equal to, or greater than, a second predetermined pressure value Pmax, which is greater than said first predetermined pressure value Pmin.

For example, the control means 320 may be arranged to selectively:

- if said second coupling means 308 is already in its first state, keep said second coupling means 308 in its first state, and cause said first coupling means 304 to assume or keep the second state in which it disconnects said electric motor 301 from said first compressor 303, so that the driving torque generated by the electric motor 301 is not transmitted to said first compressor 303;
- if said second coupling means 308 is not already in its first state, make said second coupling means 308 assume the first state in which it connects said electric motor 301 to said second compressor 307, so that the driving torque generated by the electric motor 301 is transmitted to said second compressor 307, and cause said first coupling means 304 to assume or keep the second state in which it disconnects said electric motor 301 from said first compressor 303, so that the driving torque generated by the electric motor 301 is not transmitted to said first compressor 303;

or,

- if said first coupling means 304 is already in its first state, keep said first coupling means 304 in its first state, and cause said second coupling means 308 to assume or keep the second state in which it disconnects said electric motor 301 from said second compressor 307, so that the driving torque generated by the electric motor 301 is not transmitted to said second compressor 307;

if said first coupling means 304 is not already in its first state, make said first coupling means 304 assume the first state in which it connects said electric motor 301 to said first compressor 303, so that the driving torque generated by the electric motor 301 is transmitted to said first compressor 303, and cause said second coupling means 308 to assume or keep the second state in which it disconnects said electric motor 301 from said second compressor 307, so that the driving torque generated by the electric motor 301 is not transmitted to said second compressor 307.

For example, referring to the exemplary operating cycle of FIG. 6, following the instant T2 in which the second predetermined pressure value Pmax is reached, the pressure in the main reservoir 311 may begin to drop towards the first predetermined pressure value Pmin due to a request for compressed air by one or more users 205, 206, 207. When at instant T3 the pressure in the main reservoir 311 has reached first predetermined pressure value Pmin (i.e. when it is necessary to bring the pressure in the main reservoir from the first predetermined pressure value Pmin to the second predetermined pressure value Pmax), the control unit 320 may choose which of the first compressor 303 and the second compressor 307 is to be coupled to the electric motor 301, and may couple the selected compressor to the electric motor 301 by controlling the coupling means (e.g. the electromechanical clutch) associated with the selected compressor, in its first state in which it transmits driving torque from the electric motor 301 to the selected compressor, and may for example control the electric motor 301 to rotate at a second speed V2, less than or equal to said first speed V1, i.e. V2≤V1. The other unselected compressor is not coupled to the electric motor 301 by controlling the coupling means (e.g. the electromechanical clutch) associated with the unselected compressor, in its second state in which it does not transmit driving torque from the electric motor 301 to the unselected compressor. In the embodiment described above, the preselected compressor may be any one between the first compressor 303 and the second compressor 307.

Preferably, according to a first criterion, the control means 320 may be arranged to measure a first overall activation time of said first compressor 303 and to measure a second overall activation time of said second compressor 307.

When the pressure value measured by said pressure sensor means is equal to the first predetermined pressure value Pmin or comprised between the first predetermined pressure value Pmin and the second predetermined pressure value Pmax, and the first overall activation time of said first compressor 303 is greater than said second overall activation time of said second compressor 307, said control means 320 may be arranged to:

control said second coupling means 308 so that it is in its first state in which it connects said electric motor 301 to said second compressor 307, and control said first coupling means 304 so that it is in its second state in which it disconnects said electric motor 301 from said first compressor 303;

keep said second coupling means 308 in its first state and said first coupling means 304 in its second state, until the pressure value measured by said pressure sensor means is equal to, or greater than, the second predetermined pressure value Pmax, greater than said first predetermined pressure value Pmin.

For example, the control means 320 may be arranged to:

if said second coupling means 308 is already in its first state, keep said second coupling means 308 in its first state, and cause said first coupling means 304 to assume or keep the second state in which it disconnects said electric motor 301 from said first compressor 303, so that the driving torque generated by the electric motor 301 is not transmitted to said first compressor 303;

if said second coupling means 308 is not already in its first state, make said second coupling means 308 assume the first state in which it connects said electric motor 301 to said second compressor 307, so that the driving torque generated by the electric motor 301 is transmitted to said second compressor 307, and cause said first coupling means 304 to assume or keep the second state in which it disconnects said electric motor 301 from said first compressor 303, so that the driving torque generated by the electric motor 301 is not transmitted to said first compressor 303.

When, instead, the pressure value measured by said pressure sensor means is equal to the first predetermined pressure value Pmin or comprised between the first predetermined pressure value Pmin and the second predetermined pressure value Pmax, and the first overall activation time of said first compressor 303 is shorter than said second overall activation time of said second compressor 307, said control means 320 may be arranged to:

control said first coupling means 304 so that it is in its first state in which it connects said electric motor 301 to said first compressor 303, and control said second coupling means 308 so that it is in its second state in which it disconnects said electric motor 301 from said second compressor 307;

keep said first coupling means 304 in its first state, and said second coupling means 308 in its second state, until the pressure value measured by said pressure sensor means is equal to, or greater than, a second predetermined pressure value Pmax, which is greater than said first predetermined pressure value Pmin.

For example, the control means 320 may be arranged to:

if said first coupling means 304 is already in its first state, keep said first coupling means 304 in its first state, and cause said second coupling means 308 to assume or keep the second state in which it disconnects said electric motor 301 from said second compressor 307, so that the driving torque generated by the electric motor 301 is not transmitted to said second compressor 307;

if said first coupling means 304 is not already in its first state, make said first coupling means 304 assume the first state in which it connects said electric motor 301 to said first compressor 303, so that the driving torque generated by the electric motor 301 is transmitted to said first compressor 303, and cause said second coupling means 308 to assume or keep the second state in which it disconnects said electric motor 301 from said second compressor 307, so that the driving torque generated by the electric motor 301 is not transmitted to said second compressor 307.

In other words, in the first criterion just described, when it is necessary to bring the pressure in the main reservoir from the first predetermined pressure value Pmin to the second predetermined pressure value Pmax, the control means 320 (e.g. the control unit) may count the cumulative usage time of the first compressor and the second compressor and choose to connect the compressor with the shortest usage time to the electric motor, in order to better equalize the consumption of the components of the first compressor and the second compressor, so as to reach the deadline of the maintenance cycle at the same time.

Preferably, according to a second criterion, the control means 320 may be arranged to measure a first overall activation time of said first compressor 303 and to measure a second overall activation time of said second compressor 307. The control means 320 may be arranged to:

if the first overall activation time of said first compressor 303 is greater than said second overall activation time of said second compressor 307, prevent activation of the first compressor 303 for a first inhibition time period;

if the first overall activation time of said first compressor 303 is shorter than said second overall activation time of said second compressor 307, prevent activation of the second compressor 307 for a second inhibition time period.

In this case, in said first inhibition time period, when the pressure value measured by said pressure sensor means is equal to the first predetermined pressure value Pmin or comprised between the first predetermined pressure value Pmin and the second predetermined pressure value Pmax, said control means 320 may be arranged to:

control said second coupling means 308 so that it is in its first state in which it connects said electric motor 301 to said second compressor 307, and control said first coupling means 304 so that it is in its second state in which it disconnects said electric motor 301 from said first compressor 303;

keep said second coupling means 308 in its first state and said first coupling means 304 in its second state, until the pressure value measured by said pressure sensor means is equal to, or greater than, the second predetermined pressure value Pmax, greater than said first predetermined pressure value Pmin.

For example, the control means 320 may be arranged to:

if said second coupling means 308 is already in its first state, keep said second coupling means 308 in its first state, and cause said first coupling means 304 to assume or keep the second state in which it disconnects said electric motor 301 from said first compressor 303, so that the driving torque generated by the electric motor 301 is not transmitted to said first compressor 303;

if said second coupling means 308 is not already in its first state, make said second coupling means 308 assume the first state in which it connects said electric motor 301 to said second compressor 307, so that the driving torque generated by the electric motor 301 is transmitted to said second compressor 307, and cause said first coupling means 304 to assume or keep the second state in which it disconnects said electric motor 301 from said first compressor 303, so that the driving torque generated by the electric motor 301 is not transmitted to said first compressor 303.

In said second inhibition time period, when the pressure value measured by said pressure sensor means is equal to the first predetermined pressure value Pmin or comprised between the first predetermined pressure value Pmin and the second predetermined pressure value Pmax, said control means 320 may be arranged to:

control said first coupling means 304 so that it is in its first state in which it connects said electric motor 301 to said first compressor 303, and control said second coupling means 308 so that it is in its second state in which it disconnects said electric motor 301 from said second compressor 307;

keep said first coupling means 304 in its first state, and said second coupling means 308 in its second state, until the pressure value measured by said pressure sensor means is equal to, or greater than, a second predetermined pressure value Pmax, which is greater than said first predetermined pressure value Pmin.

For example, the control means 320 may be arranged to:

if said first coupling means 304 is already in its first state, keep said first coupling means 304 in its first state, and cause said second coupling means 308 to assume or keep the second state in which it disconnects said electric motor 301 from said second compressor 307, so that the driving torque generated by the electric motor 301 is not transmitted to said second compressor 307;

if said first coupling means 304 is not already in its first state, make said first coupling means 304 assume the first state in which it connects said electric motor 301 to said first compressor 303, so that the driving torque generated by the electric motor 301 is transmitted to said first compressor 303, and cause said second coupling means 308 to assume or keep the second state in which it disconnects said electric motor 301 from said second compressor 307, so that the driving torque generated by the electric motor 301 is not transmitted to said second compressor 307.

In other words, in the second criterion just described, the control unit 320 may re-count the cumulative usage time of the first compressor and second compressor and, for example at the start of the operating day, the control unit 320 may choose the compressor that has the shortest cumulative usage time and, when it is necessary to bring the pressure in the main reservoir from the first predetermined pressure value Pmin to the second predetermined pressure value Pmax, it may use it for a predetermined period, inhibiting the other compressor in such predetermined period (e.g. all day).

Preferably, according to a third criterion, said control unit may be arranged to define first time-intervals in which activation of the first compressor 303 is prevented and second time-intervals in which activation of second compressor 307 is prevented. Said first time-intervals and said second time-intervals may be alternated to each other over time. When in one of said first time-intervals, the pressure value measured by said pressure sensor means is equal to the first predetermined pressure value Pmin or comprised between the first predetermined pressure value Pmin and the second predetermined pressure value Pmax, said control means 320 may be arranged to:

control said second coupling means 308 so that it is in its first state in which it connects said electric motor 301 to said second compressor 307, and control said first coupling means 304 so that it is in its second state in which it disconnects said electric motor 301 from said first compressor 303;

keep said second coupling means 308 in its first state and said first coupling means 304 in its second state, until the pressure value measured by said pressure sensor means is equal to, or greater than, the second predetermined pressure value Pmax, greater than said first predetermined pressure value Pmin.

For example, the control means 320 may be arranged to:

if said second coupling means 308 is already in its first state, keep said second coupling means 308 in its first state, and cause said first coupling means 304 to assume or keep the second state in which it disconnects said electric motor 301 from said first compressor 303, so that the driving torque generated by the electric motor 301 is not transmitted to said first compressor 303;

if said second coupling means 308 is not already in its first state, make said second coupling means 308 assume the first state in which it connects said electric motor 301 to said second compressor 307, so that the driving torque generated by the electric motor 301 is transmitted to said second compressor 307, and cause said first coupling means 304 to assume or keep the second state in which it disconnects said electric motor 301 from said first compressor 303, so that the driving torque generated by the electric motor 301 is not transmitted to said first compressor 303.

Moreover, when in one of said second time-intervals, the pressure value measured by said pressure sensor means is equal to the first predetermined pressure value Pmin or comprised between the first predetermined pressure value Pmin and the second predetermined pressure value Pmax, said control means 320 may be arranged to:

control said first coupling means 304 so that it is in its first state in which it connects said electric motor 301 to said first compressor 303, and control said second coupling means 308 so that it is in its second state in which it disconnects said electric motor 301 from said second compressor 307;

keep said first coupling means 304 in its first state, and said second coupling means 308 in its second state, until the pressure value measured by said pressure sensor means is equal to, or greater than, a second predetermined pressure value Pmax, which is greater than said first predetermined pressure value Pmin.

For example, the control means 320 may be arranged to:

if said first coupling means 304 is already in its first state, keep said first coupling means 304 in its first state, and cause said second coupling means 308 to assume or keep the second state in which it disconnects said electric motor 301 from said second compressor 307, so that the driving torque generated by the electric motor 301 is not transmitted to said second compressor 307;

if said first coupling means 304 is not already in its first state, make said first coupling means 304 assume the first state in which it connects said electric motor 301 to said first compressor 303, so that the driving torque generated by the electric motor 301 is transmitted to said first compressor 303, and cause said second coupling means 308 to assume or keep the second state in which it disconnects said electric motor 301 from said second compressor 307, so that the driving torque generated by the electric motor 301 is not transmitted to said second compressor 307.

In other words, in the third criterion just described, when it is necessary to bring the pressure in the main reservoir from the first predetermined pressure value Pmin to the second predetermined pressure value Pmax, the control unit 320 may alternatively use the two compressors at alternate regular periods, for example non-exclusive on alternate days. In this way, the selected compressor may be kept for a period, always at temperature to limit the formation of condensation inside the compressor due to excessive cooling and the wear of the first compressor and the second compressor is balanced.

Preferably, it may apply to all the embodiments described above that when the pressure value measured by said pressure sensor means is between the first predetermined pressure value Pmin and the second predetermined pressure value Pmax, which is greater than the first predetermined pressure value Pmin, the control means 320 may be arranged to:

drive the electric motor 301, so as to generate a driving torque having a second torque value, less than said first torque value.

Preferably, in addition or alternatively to what has been said for the condition in which said pressure value is lower than the first predetermined pressure value Pmin and for the condition in which said pressure value is equal to the first predetermined pressure value Pmin or comprised between the first predetermined pressure value Pmin and the second predetermined pressure value Pmax, when the pressure value measured by said pressure sensor means is equal to or greater than the second predetermined pressure value Pmax, greater than said first predetermined value of pressure Pmin, said control means 320 may be arranged to:

control said first coupling means 304 so that it is in its second state in which it disconnects said electric motor 301 from said first compressor 303;

control said second coupling means 308 so that it is in its second state in which it disconnects said electric motor 301 from said second compressor 307;

keep said first coupling means 304 in its second state, and said second coupling means 308 in its second state, until the pressure value measured by said pressure sensor means is equal to, or lower than, said first predetermined pressure value Pmin.

For example, the control means 320 may be arranged to:

if said first coupling means 304 is not already in its second state, cause said first coupling means 304 to assume the second state in which it disconnects said electric motor 301 from said first compressor 303, so that the driving torque generated by the electric motor 301 is not transmitted to said first compressor 303;

if said second coupling means 308 is not already in its second state, cause said second coupling means 308 to assume the second state in which it disconnects said electric motor 301 from said second compressor 307, so that the driving torque generated by the electric motor 301 is not transmitted to said second compressor 307.

In other words, with reference to the exemplary operating cycle of FIG. 6, when at an instant T2 the pressure value Pmax is reached, the control means 320 may turn off the electric motor 301 and control the first coupling means 304 (e.g. the first electromechanical clutch) and the second coupling means 308 (e.g. the second electromechanical clutch 308) in their second state in which they do not transmit driving torque from the electric motor 301 to the first compressor 303 and the second compressor 307, respectively.

Preferably, when the pressure value measured by said pressure sensor means is equal to or higher than the second predetermined pressure value Pmax, the control means 320 may be arranged to:

drive the electric motor 301, so as to generate a driving torque of zero value.

Preferably, the compressed air generation system of at least one vehicle may comprise a first air dryer means 310 and a second air dryer means 313. The first air dryer means 310 may be arranged to receive the compressed air generated by the first compressor 303 and generate first dried compressed air to be supplied to said main reservoir 311. The second air dryer means 313 may be arranged to receive the compressed air generated by the second compressor 307 and generate second dried compressed air to be supplied to said main reservoir 311.

For example, the first compressor 303 may feed a first dryer 310, which in turn may feed the main reservoir 311 through a non-return valve 312. The second compressor 307 may feed a second dryer 313, which in turn feeds the main reservoir 311 through a non-return valve 314.

Or, the compressed air generation system of at least one vehicle may comprise only one air dryer means. In this case, the air dryer means may be arranged to receive compressed air generated by the first compressor 303, receive compressed air generated by the second compressor 307 and generate dried compressed air to be supplied to said main reservoir 311.

Figure 4:
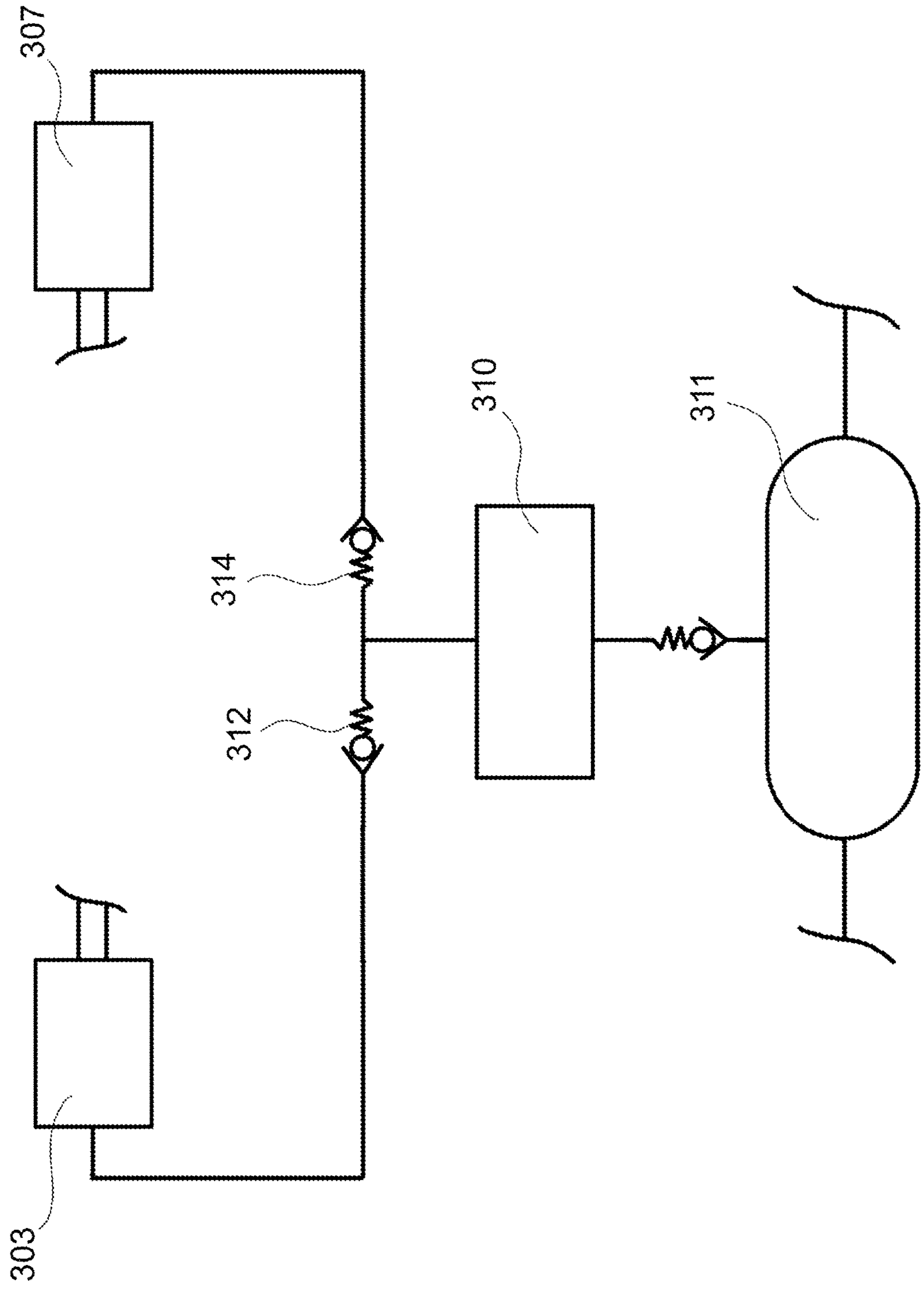
FIG. 4 illustrates a further embodiment of a compressed air generation system of at least one vehicle.

For example, referring to FIG. 4, the first compressor 303 and the second compressor 307 may supply compressed air to a single dryer 310, for example through two non-return valves 312, 314, respectively.

Preferably, the electric motor 301 may comprise a first drive shaft 302 arranged to transmit driving torque to a first compressor 303 through the first coupling means 304 and a first mechanical coupling 305, and a second drive shaft 306, arranged to be integral with the said first drive shaft 302 and to transmit the driving torque to the second compressor 307 through the second coupling means 308 and a second mechanical coupling 309.

Preferably, in a further embodiment, the electric motor 301 may comprise a drive shaft 501 on which the first coupling means 304 and the second coupling means 308 are arranged to be bound. In this case, the compressed air generation system of at least one vehicle may comprise a first pulley 505 and a second pulley 507. The first pulley 505 may be arranged to be mechanically bound to a shaft 504 of the first compressor 303, and the second pulley 507 may be arranged to be mechanically bound to a shaft 506 of a second compressor 307. The first coupling means 502, 304 may be arranged to transmit driving torque to the first pulley 505 by at least one drive belt 508, and the second coupling means 503, 308 may be arranged to transmit driving torque to the second pulley 507 by at least one drive belt 509.

Preferably, the first coupling means 304 may be an electromechanical clutch.

Preferably, the second coupling means 308 may also be an electromechanical clutch.

For example, the first predetermined pressure value Pmin may generally assume values of between 6 bar and 7 bar, and the second predetermined pressure value Pmax may generally assume values of between 9 bar and 10 bar.

In a first implementation example, a compressed air generation system 300 may comprise an electric motor 301 having a first drive shaft 302 for transmitting driving torque to a first compressor 303 through a first coupling means 304, such as for example a first electromechanical clutch, and a first mechanical coupling 305.

Furthermore, the electric motor 301 may be provided with a second drive shaft 306, integral with the first drive shaft 302, for transmitting driving torque to a second compressor 307 through a second coupling means 308, such as for example a second electromechanical clutch, and a second mechanical coupling 309.

The first compressor 303 may feed a first dryer means 310, for example a first dryer, which in turn may feed the main reservoir 311 through a non-return valve 312.

The second compressor 307 may feed a second dryer means 313, for example a second dryer, which in turn may feed the main reservoir 311 through a non-return valve 314.

The control means 320, for example a control unit, may be arranged to:

receive a power supply 321;

control, through a power signal 323, the first coupling means 304 in a first state in which the first coupling means 304 transmits driving torque from the electric motor 301 to the first compressor 303 and in a second state in which the first coupling means 304 does not transmit torque from the electric motor 301 to the first compressor 303: and drive the second coupling means 308 through a power signal 324 in a first state in which the second coupling means 308 transmits driving torque from the electric motor 301 to the second compressor 307 and in a second state in which the second coupling means 308 does not transmits driving torque from the electric motor 301 to the second compressor 307;

Drive the electric motor 301 at variable speed by means of a group of power signals 325.

The pressure sensor means 321, for example a pressure transducer 321, may measure the pressure inside the main reservoir 311 and send its value 322 to the control unit 320.

Figure 5:
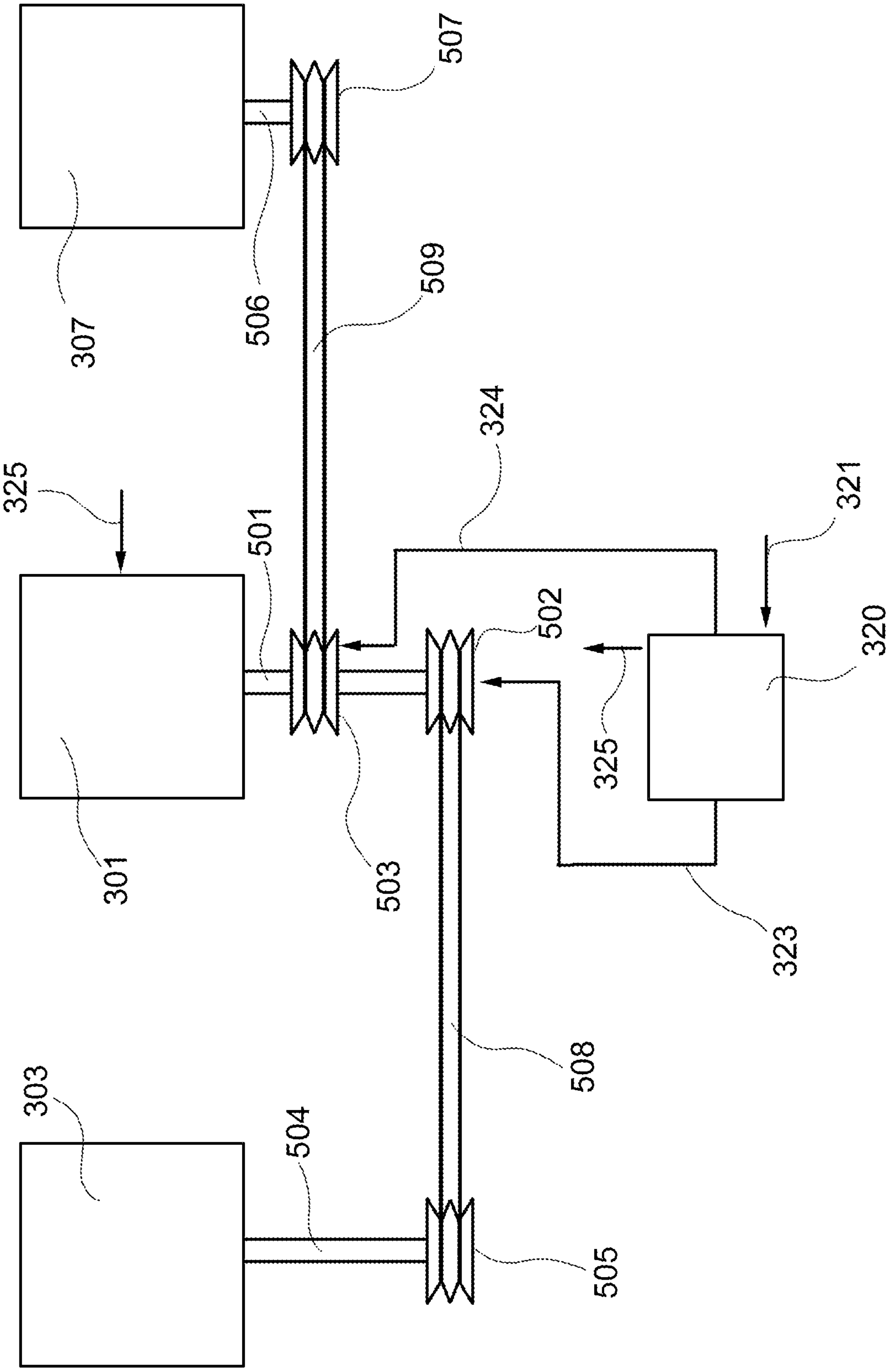
FIG. 5 illustrates a still further embodiment of a compressed air generation system of at least one vehicle.

In a second implementation example, with reference to FIG. 5, the electric motor 301 may have a drive shaft 501 on which the first coupling means 502, for example a first electromechanical clutch, and a second coupling means, for example a second electromechanical clutch 503, are mechanically bound. Both coupling means 502, 503 may have the peripheral shape of a pulley for driving at least one drive belt. A first pulley 505 may be mechanically bound to a shaft 504 of the first compressor 303, and a second pulley 507 may be mechanically bound to a shaft 506 of a second compressor 307.

The first coupling means 502 may transmit driving torque to the first pulley 505 by means of at least one drive belt 508. The second coupling means 503 may transmit driving torque to the second pulley 507 by means of at least one drive belt 509.

The control means 320, for example a control unit 320, may be arranged to:

receive a power supply 321;

control, through a power signal 323, the first coupling means 503 in a first state in which the first coupling means 503 transmits driving torque from the electric motor 301 to the first compressor 303 and in a second state in which the first coupling means 503 does not transmit torque from the electric motor 301 to the first compressor 303;

drive the second coupling means 503 through a power signal 324 in a first state in which the second coupling means 503 transmits driving torque from the electric motor 301 to the second compressor 307 and in a second state in which the second coupling means 308 does not transmits driving torque from the electric motor 301 to the second compressor 307.

Drive the electric motor 301 at variable speed by means of a group of power signals 325.

What has been described above for at least one vehicle, for example railway vehicle, may be applied similarly for a plurality of railway vehicles connected to each other to form a convoy, for example a railway convoy.

As described above, the present invention is particularly applicable to the field of railway vehicles/convoys that travel on railway tracks. For example, a vehicle referred to herein may be a locomotive or a wagon, and a route/section may include rails on which the wheels of the locomotive roll. The embodiments described herein are not intended to be limited to vehicles on tracks. For example, the vehicle may be a car, a truck (for example a highway semi-trailer truck, a mining truck, a truck for transporting timber or the like) or the like, and the route may be a road or a trail. For example, a convoy may comprise a plurality of such vehicles connected or associated with each other.

Various aspects and embodiments of a method for generating compressed air of at least one railway vehicle and of a system for generating compressed air of at least one railway vehicle according to the invention have been described. It is understood that each embodiment may be combined with any other embodiment. Moreover, the invention is not limited to the embodiments described, but may be varied within the scope defined by the appended claims.

The invention claimed is:

1. A method for generating compressed air of at least one vehicle, comprising the step of;

a) selectively connecting a first compressor arranged to generate compressed air, or a second compressor arranged to generate compressed air, or simultaneously said first compressor and said second compressor, to an electric motor arranged to generate a driving torque.

2. The method for generating compressed air of at least one vehicle according to claim 1, comprising the step of;

measuring a pressure value indicative of the internal pressure of a main reservoir arranged to store compressed air generated by said first compressor and said second compressor, wherein the pressure value within said main reservoir is arranged to assume over time a value within a pressure range including;

a null value;

a first predetermined pressure value (Pmin);

a second predetermined pressure value (Pmax), greater than said first predetermined pressure value (Pmin).

3. The method for generating compressed air of at least one vehicle according to claim 2, wherein, when the pressure value in said main reservoir is less than said first predetermined pressure value (Pmin), step a) comprises;

connecting said first compressor to said electric motor;

connecting said second compressor to said electric motor;

keeping said first compressor and said second compressor connected to said electric motor until the pressure value in said main reservoir reaches or exceeds said first predetermined pressure value (Pmin).

4. The method for generating compressed air of at least one vehicle according to claim 2, wherein, when the pressure value in said main reservoir is equal to, or greater than, said second predetermined pressure value (Pmax), step a) comprises;

disconnecting, or keeping disconnected, said first compressor from said electric motor;

disconnecting, or keeping disconnected, said second compressor from said electric motor;

keeping said first compressor and said second compressor disconnected from said electric motor, until the pressure value in said main reservoir is equal to or less than said first predetermined pressure value (Pmin).

5. The method for generating compressed air of at least one vehicle according to claim 2, wherein when the pressure value in said main reservoir is equal to the first predetermined pressure value (Pmin) or comprised between the first predetermined pressure value (Pmin) and the second predetermined pressure value (Pmax), step a) selectively comprises;

connecting, or keeping connected, said second compressor to said electric motor;

disconnecting, or keeping disconnected, said first compressor from said electric motor;

keeping said second compressor connected to said electric motor, and keeping said first compressor disconnected from said electric motor, until the pressure value in said main reservoir is equal to or greater than the second predetermined pressure value (Pmax);

or, disconnecting, or keeping disconnected, said second compressor from said electric motor;

connecting, or keeping connected, said first compressor to said electric motor;

keeping said second compressor disconnected from said electric motor, and keeping said first compressor connected to said electric motor, until the pressure value in said main reservoir is equal to or greater than the second predetermined pressure value (Pmax).

6. A system for generating compressed air of at least one vehicle, particularly at least one railway vehicle, comprising:

a first compressor arranged to generate compressed air;

a second compressor arranged to generate compressed air;

an electric motor arranged to generate a driving torque;

a first coupling means, arranged to selectively assume a first state in which it connects said electric motor to said first compressor or a second state in which it disconnects said electric motor from said first compressor;

a second coupling means, arranged to selectively assume a first state in which it connects said electric motor to said second compressor or a second state in which it disconnects said electric motor from said second compressor; and a control means arranged to control the transition between the first state and the second state, and vice versa, of said first coupling means and the transition between the first state and the second state, and vice versa, of said second coupling means, so that said driving torque generated by said electric motor is selectively supplied to the first compressor or to the second compressor or simultaneously to said first compressor and to said second compressor.

7. The system for generating compressed air of at least one vehicle according to claim 6, comprising:

a main reservoir arranged to store compressed air generated by said first compressor and said second compressor; and a pressure sensor means arranged to measure a pressure value inside said main reservoir;

wherein the pressure value within said main reservoir is arranged to assume over time a pressure value within a range of pressures including a null value, a first predetermined pressure value (Pmin) greater than said null value, and a second predetermined pressure value (Pmax), greater than said first predetermined pressure value (Pmin).

8. The system for generating compressed air of at least one vehicle according to claim 7, wherein, when the pressure value measured by the pressure sensor means is less than the first predetermined pressure value (Pmin), said control means is arranged to:

control said first coupling means so that it is in its first state in which it connects said electric motor to said first compressor;

control said second coupling means so that it is in its first state in which it connects said electric motor to said second compressor;

keep said first coupling means in its first state and said second coupling means in its first state, until the pressure value measured by said pressure sensor means reaches said first predetermined pressure value (Pmin).

9. The system for generating compressed air of at least one vehicle according to claim 7, wherein, when the pressure value measured by said pressure sensor means is equal to the first predetermined pressure value (Pmin) or comprised between the first predetermined pressure value (Pmin) and the second predetermined pressure value (Pmax), said control means is arranged to selectively;

control said second coupling means so that it is in its first state in which it connects said electric motor to said second compressor, and control said first coupling means so that it is in its second state in which it disconnects said electric motor from said first compressor;

keep said second coupling means in its first state and said first coupling means in its second state, until the pressure value measured by said pressure sensor means is equal to, or greater than, the second predetermined pressure value (Pmax), greater than said first predetermined pressure value (Pmin);

or, control said first coupling means so that it is in its first state in which it connects said electric motor to said first compressor, and control said second coupling means so that it is in its second state in which it disconnects said electric motor from said second compressor;

keep said first coupling means in its first state, and said second coupling means in its second state, until the pressure value measured by said pressure sensor means is equal to, or greater than, the second predetermined pressure value (Pmax), which is greater than said first predetermined pressure value (Pmin).

10. The system for generating compressed air of at least one vehicle according to claim 7, wherein said control means is arranged to measure a first overall activation time of said first compressor and to measure a second overall activation time of said second compressor;

wherein, when the pressure value measured by said pressure sensor means is equal to the first predetermined pressure value (Pmin) or comprised between the first predetermined pressure value (Pmin) and the second predetermined pressure value (Pmax), and the first overall activation time of said first compressor is greater than said second overall activation time of said second compressor, said control means is arranged to:

control said second coupling means so that it is in its first state in which it connects said electric motor to said second compressor, and control said first coupling means so that it is in its second state in which it disconnects said electric motor from said first compressor;

keep said second coupling means in its first state and said first coupling means in its second state, until the pressure value measured by said pressure sensor means is equal to, or greater than, the second predetermined pressure value (Pmax), greater than said first predetermined pressure value (Pmin);

wherein, when the pressure value measured by said pressure sensor means is equal to the first predetermined pressure value (Pmin) or comprised between the first predetermined pressure value (Pmin) and the second predetermined pressure value (Pmax), and the first overall activation time of said first compressor is shorter than said second overall activation time of said second compressor, said control means is arranged to:

control said first coupling means so that it is in its first state in which it connects said electric motor to said first compressor, and control said second coupling means so that it is in its second state in which it disconnects said electric motor from said second compressor;

keep said first coupling means in its first state, and said second coupling means in its second state, until the pressure value measured by said pressure sensor means is equal to, or greater than, the second predetermined pressure value (Pmax), which is greater than said first predetermined pressure value (Pmin).

11. The system for generating compressed air of at least one vehicle according to claim 7, wherein said control means is arranged to measure a first overall activation time of said first compressor and to measure a second overall activation time of said second compressor;

wherein said control means is arranged to:

if the first overall activation time of said first compressor is greater than said second overall activation time of said second compressor, prevent activation of the first compressor for a first inhibition time period;

if the first overall activation time of said first compressor is shorter than said second overall activation time of said second compressor, prevent activation of the second compressor for a second inhibition time period.

12. The system for generating compressed air of at least one vehicle according to claim 11, wherein in said first inhibition time period, when the pressure value measured by said pressure sensor means is equal to the first predetermined pressure value (Pmin) or comprised between the first predetermined pressure value (Pmin) and the second predetermined pressure value (Pmax), said control means is arranged to:

control said second coupling means so that it is in its first state in which it connects said electric motor to said second compressor, and control said first coupling means so that it is in its second state in which it disconnects said electric motor from said first compressor;

keep said second coupling means in its first state and said first coupling means in its second state, until the pressure value measured by said pressure sensor means is equal to, or greater than, the second predetermined pressure value (Pmax), greater than said first predetermined pressure value (Pmin);

wherein, in said second inhibition time period, when the pressure value measured by said pressure sensor means is equal to the first predetermined pressure value (Pmin) or comprised between the first predetermined pressure value (Pmin) and the second predetermined pressure value (Pmax), said control means is arranged to:

control said first coupling means so that it is in its first state in which it connects said electric motor to said first compressor, and control said second coupling means so that it is in its second state in which it disconnects said electric motor from said second compressor;

keep said first coupling means in its first state, and said second coupling means in its second state, until the pressure value measured by said pressure sensor means is equal to, or greater than, the second predetermined pressure value (Pmax), which is greater than said first predetermined pressure value (Pmin).

13. The system for generating compressed air of at least one vehicle according to claim 7, wherein said control unit means is arranged to define first time-intervals in which activation of the first compressor is prevented, and second time-intervals in which activation of the second compressor is prevented, wherein said first time-intervals and said second time-intervals are alternated to each other in time;

wherein, when in one of said first time-intervals, the pressure value measured by said pressure sensor means is equal to the first predetermined pressure value (Pmin) or comprised between the first predetermined pressure value (Pmin) and the second predetermined pressure value (Pmax), said control means is arranged to:

control said second coupling means so that it is in its first state in which it connects said electric motor to said second compressor, and control said first coupling means so that it is in its second state in which it disconnects said electric motor from said first compressor;

keep said second coupling means in its first state and said first coupling means in its second state, until the pressure value measured by said pressure sensor means is equal to, or greater than, the second predetermined pressure value (Pmax), greater than said first predetermined pressure value (Pmin);

wherein, when in one of said second time-intervals, the pressure value measured by said pressure sensor means is equal to the first predetermined pressure value (Pmin) or comprised between the first predetermined pressure value (Pmin) and the second predetermined pressure value (Pmax), said control means is arranged to:

control said first coupling means so that it is in its first state in which it connects said electric motor to said first compressor, and control said second coupling means so that it is in its second state in which it disconnects said electric motor from said second compressor;

keep said first coupling means in its first state, and said second coupling means in its second state, until the pressure value measured by said pressure sensor means is equal to, or greater than, the second predetermined pressure value (Pmax), which is greater than said first predetermined pressure value (Pmin).

14. The system for generating compressed air of at least one vehicle according to claim 7, wherein when the pressure value measured by said pressure sensor means is equal to, or greater than, the second predetermined pressure value (Pmax), greater than the first predetermined pressure value (Pmin), said control means is arranged to:

control said first coupling means so that it is in its second state in which it disconnects said electric motor from said first compressor;

control said second coupling means so that it is in its second state in which it disconnects said electric motor from said second compressor;

keep said first coupling means in its second state, and said second coupling means in its second state, until the pressure value measured by said pressure sensor means is equal to, or lower than, said first predetermined pressure value (Pmin).

15. The system for generating compressed air of at least one vehicle according to claim 14, wherein when the pressure value measured by said pressure sensor means is equal to, or greater than, the second predetermined pressure value (Pmax), said control means is arranged to:

drive the electric motor, so as to generate a driving torque of null value.

16. The system for generating compressed air of at least one vehicle according to claim 7, wherein when the pressure value measured by the pressure sensor means is less than the first predetermined pressure value (Pmin), said control means is arranged to:

drive the electric motor, so as to generate a driving torque having a first torque value.

17. The system for generating compressed air of at least one vehicle according to claim 16, wherein, when the pressure value measured by said pressure sensor means is between the first predetermined pressure value (Pmin) and the second predetermined pressure value (Pmax), which is greater than the first predetermined pressure value (Pmin), said control means is arranged to:

drive the electric motor, so as to generate a driving torque having a second torque value, less than or equal to said first torque value.

18. The system for generating compressed air of at least one vehicle according to claim 6, comprising an air dryer means;

wherein said air dryer means is arranged to receive compressed air generated by the first compressor, receive compressed air generated by the second compressor and generate dried compressed air to be supplied to a main reservoir.

19. The system for generating compressed air of at least one vehicle according to claim 6, wherein the electric motor comprises;

a first drive shaft arranged to transmit driving torque to the first compressor via the first coupling means and a first mechanical coupling;

a second drive shaft, arranged to be integral with the first drive shaft and to transmit the driving torque to the second compressor through the second coupling means and a second mechanical coupling.

20. The system for generating compressed air of at least one vehicle according to claim 6, wherein the electric motor comprises a drive shaft on which the first coupling means and the second coupling means are arranged to be bound;

said compressed air generation system of at least one vehicle comprising a first pulley and a second pulley;

wherein the first pulley is arranged to be mechanically bound to a shaft of the first compressor, and the second pulley is arranged to be mechanically bound to a shaft of the second compressor;

wherein the first coupling means is arranged to transmit driving torque to the first pulley by at least one drive belt, and the second coupling means is arranged to transmit driving torque to the second pulley by at least one drive belt.

* * * * *